(12) United States Patent
Yoo (10) Patent No.: US 8,339,950 B2
(45) Date of Patent: Dec. 25, 2012

(54) ROUTER AND QUEUE PROCESSING METHOD THEREOF

(75) Inventor: Tae-Joon Yoo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 167 days.

(21) Appl. No.: 12/074,067

(22) Filed: Feb. 29, 2008

(65) Prior Publication Data

US 2008/0212600 A1 Sep. 4, 2008

(30) Foreign Application Priority Data

Mar. 2, 2007 (KR) .................. 10-2007-0021078

(51) Int. Cl.
*H04L 12/26* (2006.01)

(52) U.S. Cl. ............ 370/230.1; 370/389; 709/225; 709/238

(58) Field of Classification Search ............ None
See application file for complete search history.

(56) References Cited

U.S. PATENT DOCUMENTS

| | | | |
|---|---|---|---|
| 6,804,267 B1 | 10/2004 | Long et al. | |
| 6,868,065 B1* | 3/2005 | Kloth et al. | 370/236 |
| 6,904,015 B1* | 6/2005 | Chen et al. | 370/235 |
| 7,324,442 B1* | 1/2008 | Pan et al. | 370/230 |
| 7,369,500 B1* | 5/2008 | Gallagher et al. | 370/235 |
| 7,512,122 B1* | 3/2009 | Olakangil et al. | 370/389 |
| 2005/0195740 A1* | 9/2005 | Kwon | 370/229 |
| 2006/0104294 A1* | 5/2006 | Yoo | 370/401 |
| 2007/0070907 A1* | 3/2007 | Kumar et al. | 370/235 |
| 2007/0189337 A1 | 8/2007 | Kim | |
| 2008/0101354 A1* | 5/2008 | Arndt | 370/389 |

* cited by examiner

*Primary Examiner* — Yemane Mesfin
*Assistant Examiner* — Khoa Huynh
(74) *Attorney, Agent, or Firm* — H.C. Park & Associates, PLC (57) ABSTRACT

A queue processing method and a router perform cache update and queue processing based upon whether or not the packet capacity stored in the queue exceeds a rising threshold, or whether the packet capacity stored in the queue is below a falling threshold after the packet capacity stored in the queue has exceeded the rising threshold. This queue processing method and router makes it possible to eliminate overhead associated with the update of flow information by using two caches, while concomitantly removing the inequality of packet flows via RED queue management with the expedient of using two caches.

5 Claims, 7 Drawing Sheets

DCRED (Double Cache RED) Pseudo codes

<Abbreviations>
Queue length:       len
Rising threshold;   rth
Falling threshold:  fth
First cache:        fq
Second cache:       sq
Hit count:          hit_cnt Packet enqueue algorithm
Packet p arrives at queue
if { { len > rth } || rth is not cleared }} {
   if { len > rth } { set rth }
   if { p is in sq } { P drop probability adjusts to RED for sq; update sq and fq; }
   else { P drop probability adjusts RED for fq; update sq and fq; }
}
else { len < fth && rth is not cleared; } {
   clear rth and entries in sq;
   update fq;
}
else {
   update fq;
}

FIG.7

```
Cache update algorithm
Update cache for packet P
if { P is in sq } {
    if { P is dropped } { nothing to do }
    else { ++hit_cnt; move the entry in fq and sq to bottom of queue; }
}
else if { P is in fq } {
    if { P is dropped } { nothing to do }
    else {
        ++hit_cnt;
        move the entry in fq to bottom of queue;
        if { rth is not cleared } {
            if { sq is not full } { insert this entry in sq; }
            else { the entry having smaller hit_cnt than this hit_cnt is in sq } {
                delete the entry found in sq;
                insert this entry in sq on bottom of queue;
            }
        }
    }
}
else {
    if { P is dropped } {nothing to do; }
    else {
        hit_cnt = 1;
        remove the entry in fq on top of queue and same entry in sq (if exists);
        insert this entry in fq on bottom of queue;
    }
}
```

ROUTER AND QUEUE PROCESSING METHOD THEREOF

CLAIM OF PRIORITY

This application makes reference to and claims all benefits accruing under 35 U.S.C. §119 from an application for "ROUTER AND QUEUE PROCESSING METHOD THEREOF" earlier filed in the Korean Intellectual Property Office on 2 Mar. 2007, and there duly assigned Serial No. 2007-0021078.

BACKGROUND OF THE INVENTION

1. Field of the Invention

The present invention relates to a router and a queue processing method therefore.

2. Description of the Related Art

As is well known in the art, traffic flows on the Internet have various sizes, transmission rates and transmission techniques. Queue management and scheduling processes are used in order to minimize the inequality of the traffic flow on the Internet.

By way of example, in the case of First Input First Output (FIFO) or Random Early Drop (RED) queue management, a greater bandwidth is assigned to that traffic which generates the largest volume of data. One example of queue management and scheduling is FIFO scheduling based upon drop-tail queue management which may undesirably cause such problems as global synchronization, and which suffers from a structural weakness because buffers of a router become depleted by several flows.

A queue algorithm, known as a RED technique is proposed to prevent the global synchronization; unfortunately the RED technique creates a high drop probability for all traffic in response to packets accumulating in the queue, and also causes an inequality in service rendered to network subscriber because a greater bandwidth will be assigned to a greater traffic flow during the execution of the RED technique. The RED technique is intrinsically characterized by a significant likelihood of an inequality in service rendered to network subscribers due to a palliative allocation by the RED technique, of a larger bandwidth to one, or more, subscribers attributable to a greater traffic flow originating from a minority of network users.

SUMMARY OF THE INVENTION

It is therefore, an object of the present invention to provide an improved queue processing method and an improved router.

It is another object to provide a queue processing method and a router able to overcome 5 global synchronization, and to minimize a risk that buffers of a router may become rapidly depleted by several flows of traffic.

It is still another object to provide a queue processing method and a router able to reduce a likelihood of an occurrence of inequality in service rendered to network subscribers due to an ameliorative allocation of a larger bandwidth to one, or more, subscribers attributable to a greater traffic flow originating from a minority of network users.

The present invention has been made to solve the foregoing problems with the prior art and therefore the present invention provides a router and a queue processing method thereof, which can eliminate overhead associated with the update of flow information by using two caches, and also remove the inequality of packet flows via RED queue management by using two caches.

According to an aspect of the invention, the router includes a first cache storing flow information of receiving packets; a second cache storing flow information of received packets, in a state where packet capacity stored in a queue exceeds a rising threshold, or is not below a falling threshold after exceeding the rising threshold; and a packet processor dropping a received packet by applying a high drop probability if flow information of the received packet is stored in the second cache, in the state where the packet capacity stored in the queue exceeds the rising threshold, or is not below the falling threshold after exceeding the rising threshold.

The flow information may include IP address and port number, included in the received packet; and a hit count of a packet received by the router, the packet having the IP address and the port number.

If a capacity of the second cache is not full in the state where the packet capacity stored in the queue exceeds the rising threshold, or is not below the falling threshold after exceeding the rising threshold, the packet processor may store the flow information of the received packet in the second cache, in the state where the packet capacity stored in the queue exceeds the rising threshold, or is not below the falling threshold after exceeding the rising threshold.

If the capacity of the second cache is full in the state where the packet capacity stored in the queue exceeds the rising threshold, or is not below the falling threshold after exceeding the rising threshold, the packet processor may drop flow information, which has a hit count smaller than that of the received packet from the second cache, in the state where the packet capacity stored in the queue exceeds the rising threshold, or is not below the falling threshold after exceeding the rising threshold.

The packet processor may drop the received packet by applying a low drop probability if the flow information of the received packet is not stored in the second cache, in the state where the packet capacity stored in the queue exceeds the rising threshold, or is not below the falling threshold after exceeding the rising threshold.

The packet processor may clear the second cache and then control a packet flow via drop-tail queue management if the packet capacity stored in the queue does not exceed the rising threshold, or is below the falling threshold after exceeding the rising threshold.

According to another aspect of the invention, the queue processing method of a router, which includes a first cache storing flow information of receiving packets, and a second cache storing flow information of received packets, in a state where packet capacity stored in a queue exceeds a rising threshold, or is not below a falling threshold after exceeding the rising threshold, includes procedures of: when a packet is received, checking whether or not the packet capacity stored in the queue exceeds the rising threshold, or is below the falling threshold after exceeding the rising threshold; and if the packet capacity stored in the queue exceeds the rising threshold, or is not below the falling threshold after exceeding the rising threshold, dropping the received packet by selectively applying a high or low drop probability according to whether or not flow information of the received packet is stored in the second cache.

The queue processing method may further include a procedure of: if the packet capacity stored in the queue does not exceed the rising threshold, or is below the falling threshold after exceeding the rising threshold, controlling a packet flow via drop-tail queue management.

According to a further aspect of the invention, the cache update method of a router, which includes a first cache storing flow information of receiving packets, and a second cache storing flow information of received packets, in a state where packet capacity stored in a queue exceeds a rising threshold, or is not below a falling threshold after exceeding the rising threshold, includes procedures of: checking whether or not a capacity of the second cache is full in the state where the packet capacity stored in the queue exceeds the rising threshold, or is not below the falling threshold after exceeding the rising threshold; and if the capacity of the second cache is full in the state where the packet capacity stored in the queue exceeds the rising threshold, or is not below the falling threshold after exceeding the rising threshold, dropping flow information, which has a high count smaller than that of a received packet, from the second cache, in the state where the packet capacity stored in the queue exceeds the rising threshold, or is not below the falling threshold after exceeding the rising threshold.

The cache update method may further include a procedure of: if the capacity of the second cache is not full in the state where the packet capacity stored in the queue exceeds the rising threshold, or is not below the falling threshold after exceeding the rising threshold, storing flow information of the received packet in the second cache, in the state where the packet capacity stored in the queue exceeds the rising threshold, or is not below the falling threshold after exceeding the rising threshold.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
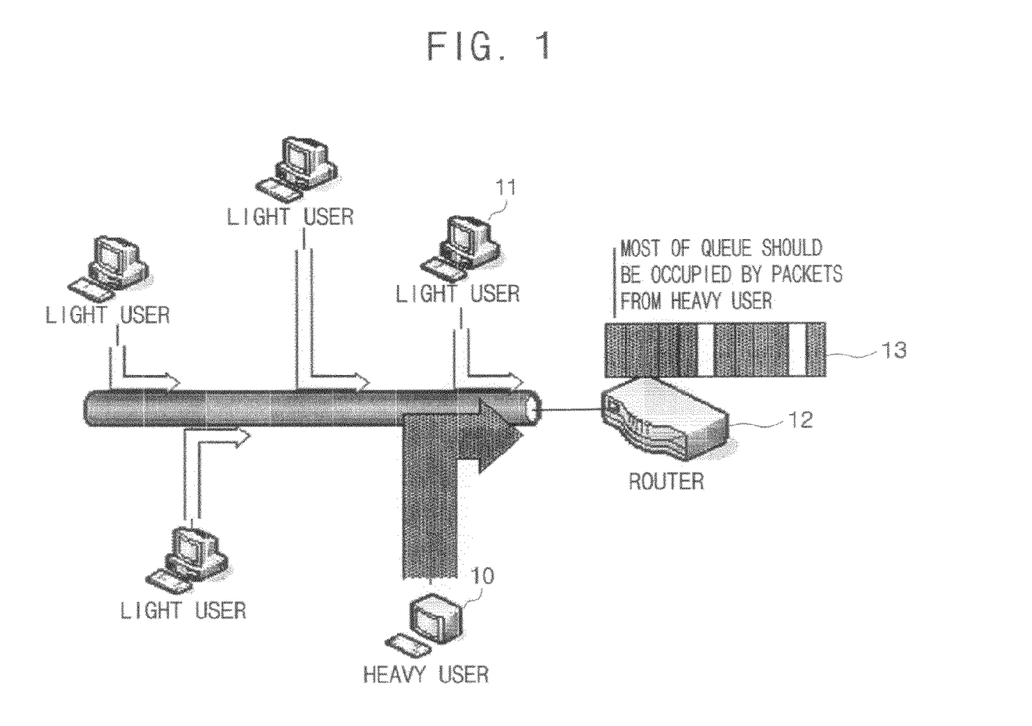
FIG. 1 is a configuration view illustrating an occurrence of the inequality of traffic in the Internet.

Turning now to the drawings, FIG. 1 illustrates a configuration demonstrating the relative inequality of traffic which may occur between multiple users of the Internet. As shown in FIG. 1, a queue 13 of a router 12 is placed in a charged state by a User Datagram Protocol (UDP) packet, which will be generated by heavy traffic demands placed upon the Internet by user terminal 10.

In this state, not only the packet generated by the heavy traffic generated by user terminal 10, but also a packet generated by a lighter use initiated by user terminal 11 are likely to be dropped. This situation, which will occur repeatedly, may cause inequality between the relative volume of traffic and the concomitant services rendered to user terminals 10, 11, in which heavy user terminal 10 occupies most bandwidth, to the detriment of the other user terminals coupled to the network.

In order to cope with this problem, various queue management and scheduling methods have been proposed.

One example is FIFO scheduling based upon drop-tail queue management. Advantageously, the FIFO scheduling can minimize overhead in simple packet forwarding and be easily implemented. FIFO scheduling based upon drop-tail queue management however, merely supports best effort services. That is, this FIFO scheduling based upon drop-tail queue management may precipitate other problems, such as global synchronization, and FIFO scheduling based upon drop-tail queue management is plagued by an intrinsic structural weakness because buffers of a router may readily be depleted by several flows of traffic.

A RED technique has been proposed; the RED technique is a queue algorithm for improving the above-mentioned situation in which inequality between the relative volume of traffic and the concomitant services rendered to user terminals 10, 11 allows heavy user terminal 10 to occupy most of the available bandwidth, thereby degrading service to all of the user terminals coupled to the network.

The RED technique is widely used since it can be easily implemented and also prevent the global synchronization, that is, the problem of drop-tail queue management.

The RED technique applies a high drop probability to all traffic in response to an accumulation of packets in the queue. This technique however, also causes inequality in the service rendered to network subscribers because a greater bandwidth will be assigned by the RED technique to a greater traffic flow generated by heavy user 10.

Hereinafter, a router and queue processing method thereof of the invention will be described more fully with reference to the accompanying drawings, in which exemplary embodiments thereof are shown.

Reference now should be made to the drawings, in which the same reference numerals and signs are used throughout the different drawings to designate the same or similar components.

Figure 2:
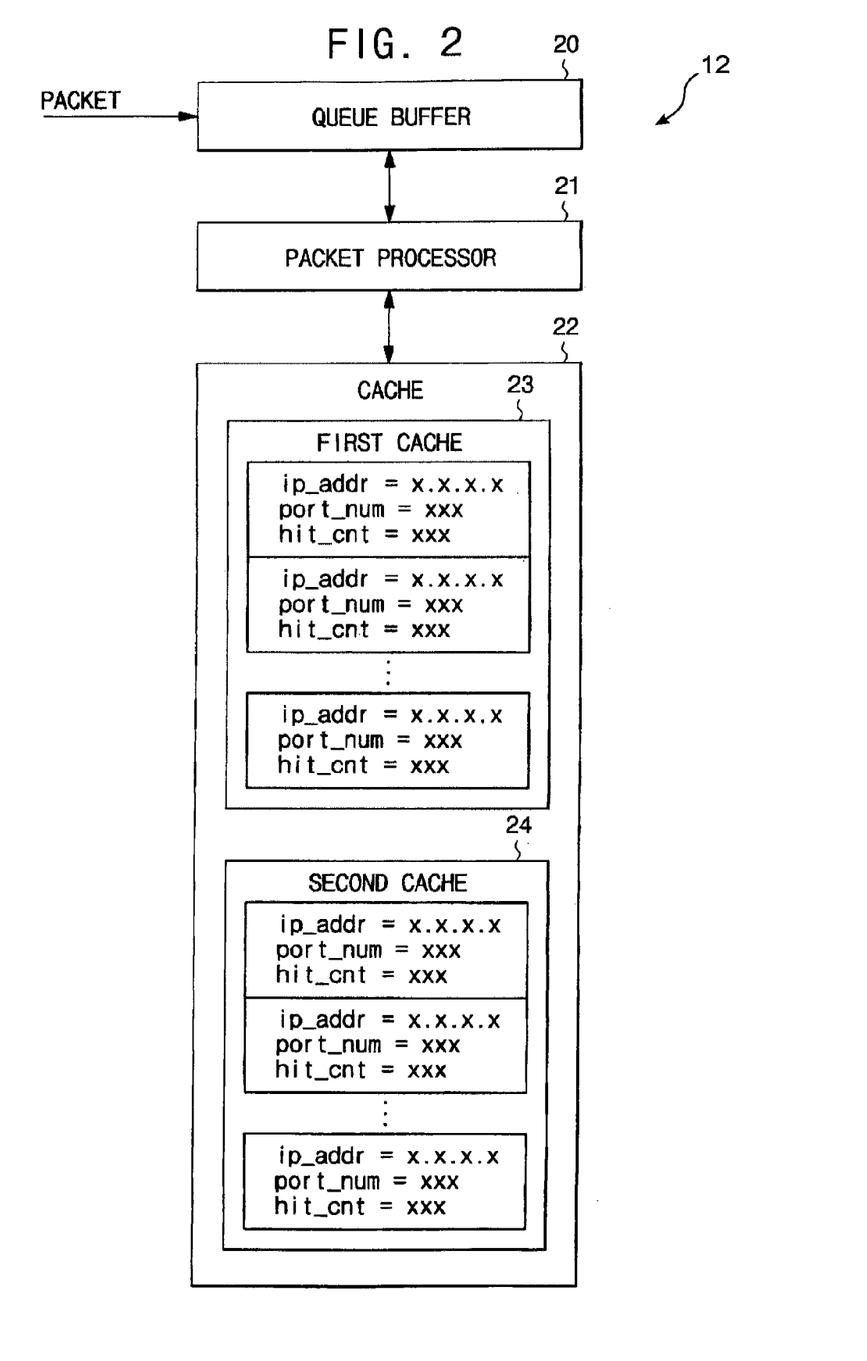
FIG. 2 is a block diagram illustrating a router constructed according to the principles of the present invention.

FIG. 2 is a block diagram illustrating a router according to the invention. As shown in FIG. 2, router includes a queue buffer 20, a packet processor 21 and a cache 22.

When a packet is received in the queue buffer 20, the packet processor 21 checks whether or not flow information of the received packet is present in a first cache 23. If the flow information of the received packet is not present in the first cache 23, the packet processor 21 deletes flow information on the top of the first cache 23, and then stores the flow information of the received packet on the bottom of the first cache 23.

The first cache 23 stores flow information of a plurality of packets. The flow information includes IP address, port number and hit count. The hit count indicates the number of packets received in the queue buffer 20.

That is, when the flow information of the packet is stored in the queue buffer 20, the hit count can increase by a predetermined value, for example, by "1" whenever a packet is received.

If packet capacity stored in a queue of the queue buffer 20 exceeds a rising threshold, or is not below a falling threshold after exceeding the rising threshold, the packet processor 21 updates a second cache 24 of the cache 22.

That is, if the capacity of the second cache 24 is not full, the packet processor 21 stores the flow information of the received packet in the second cache 24, in a state where the packet capacity stored in the queue exceeds the rising threshold, or is not below the falling threshold after exceeding the rising threshold.

Desirably, the flow information stored in the second cache 24 is stored on the bottom of the second cache 24.

The second cache 24 stores the flow information of the packet. Desirably, the capacity of the second cache 24 is smaller than that of the first cache 23.

The flow information includes IP address, port number and hit count. The hit count indicates the number of packets received in the queue buffer 20.

If the entire capacity of the second cache 24 is full, the packet processor 21 deletes flow information, which has a hit count smaller than that of the received packet, from the top, and stores it on the bottom of the second cache 24, in the state where the packet capacity stored in the queue exceeds the rising threshold, or is not below the falling threshold after exceeding the rising threshold.

Conversely, if there is no flow information, which has a hit count smaller than that of the received packet, in a state where the packet capacity stored in the queue is not below the falling threshold after exceeding the rising threshold, the packet processor 21 does not perform update on the second cache 24.

Simultaneously with the cache update, which is enabled whenever a packet is received in the queue buffer 20, the queue processing is carried out in order to eliminate the inequality of packet flows.

Below, a detailed description will be made of the queue processing.

When a packet is received in the queue buffer 20, the packet processor 21 controls packet flow via Double Cache RED (DCRED) if the packet capacity stored in the queue exceeds the rising threshold, or is not below the falling threshold after exceeding the rising threshold.

That is, the packet processor 21 checks whether or not flow information of the received packet is present in the second cache 24, in the state where the packet capacity stored in the queue exceeds the rising threshold, or is not below the falling threshold after exceeding the rising threshold.

Figure 5A:
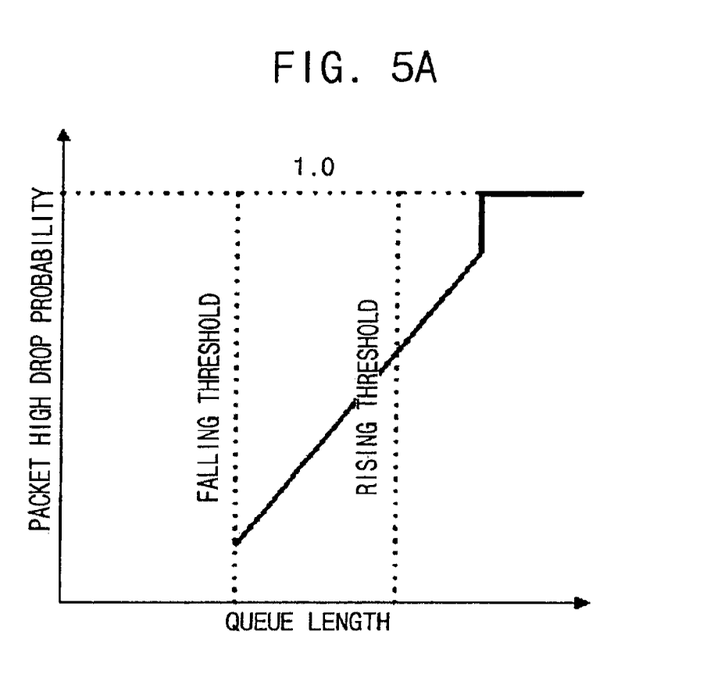
FIGS. 5A and 5B are graphs illustrating packet drop probabilities.

If the flow information of the received packet is present in the second cache 24, in the state where the packet capacity stored in the queue exceeds the rising threshold, or is not below the falling threshold after exceeding the rising threshold, the packet processor 21 drops the received packet using a high drop probability, which is shown in FIG. 5A.

Figure 5B:
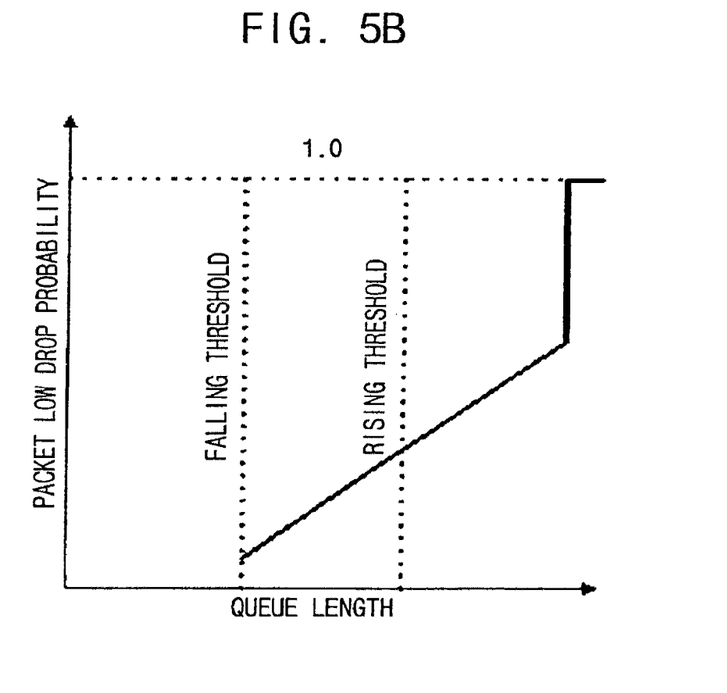

Conversely, if the flow information of the received packet is not stored in the second cache 24, in the state where the packet capacity stored in the queue exceeds the rising threshold, or is not below the falling threshold after exceeding the rising threshold, the packet processor 21 drops the received packet using a low drop probability, which is shown in FIG. 5B.

It can be appreciated that the drop probability shown in FIG. 5A is higher than the drop probability shown in FIG. 5B.

With the packet received in the queue buffer 20, if the packet capacity stored in the queue of the queue buffer 20 does not exceed the rising threshold, or is below the falling threshold after exceeding the falling threshold, the packet processor 21 clears the second cache 24 and then controls the packet flow via drop-tail queue management.

Figure 3:
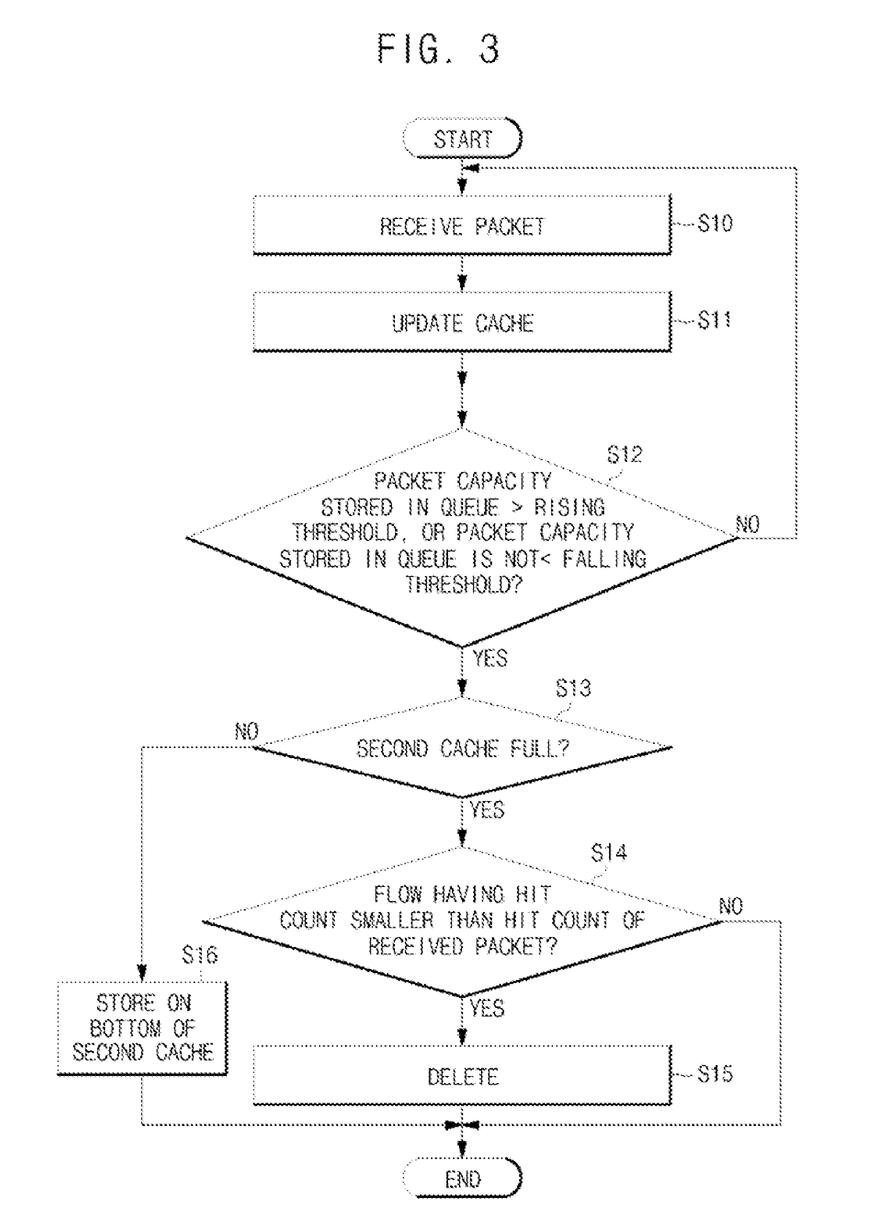
FIG. 3 is a flowchart illustrating a cache update method of a router performed in accordance with the principles of the present invention.

FIG. 3 is a flowchart illustrating a cache update method of a router according to the invention.

As shown in FIG. 3, when a packet is received in a queue buffer in S10, the router checks whether or not flow information of the received packet is present in the first cache, and if the flow information of the received packet is not present in the first cache, the packet processor deletes flow information on the top of the first cache, and then stores the flow information of the received packet on the bottom of the first cache in S11.

The first cache stores flow information of a plurality of packets. The flow information includes IP address, port number and hit count. The hit count indicates the number of packets received in the queue buffer.

That is, when the flow information of the packet is stored in the queue buffer, the hit count can increase by a predetermined value, for example, by "1" whenever a packet is received.

The router checks whether or not packet capacity stored in the queue of the queue buffer exceeds a rising threshold, or is not below a falling threshold after exceeding the rising threshold in S12.

If the packet capacity stored in a queue of the queue buffer exceeds the rising threshold, or is not below the falling threshold after exceeding the rising threshold, the packet processor updates the second cache of the cache.

The router checks whether or not the capacity of the second cache is full in S13, and if the capacity of the second cache is not full, the router stores flow information of the received packet, in a state where the packet capacity stored in the queue exceeds the rising threshold, or is not below the falling threshold after exceeding the rising threshold in S16.

Desirably, the flow information stored in the second cache is stored on the bottom of the second cache.

Desirably, the capacity of the second cache 24 is smaller than that of the first cache 23.

If the capacity of the second cache is full, the packet processor checks whether or not flow information, which has a hit count smaller than that of the received packet, is stored, in the state where the packet capacity stored in the queue exceeds the rising threshold, or is not below the falling threshold after exceeding the rising threshold in S14.

If the capacity of second cache is full, and the flow information, which has the hit count smaller than that of the received packet, is stored in the state where the packet capacity stored in the queue exceeds the rising threshold, or is not below the falling threshold after exceeding the rising threshold, the router deletes the flow information, which has the hit count smaller than that of the received packet, from the top of the second cache, and then stores the flow information of the received packet on the bottom of the second cache in S15.

Conversely, if there is no flow information, which has the hit count smaller than that of the received packet, in the state where the packet capacity stored in the queue is not below the falling threshold after exceeding the rising threshold, the router does not perform update on the second cache.

Figure 4:
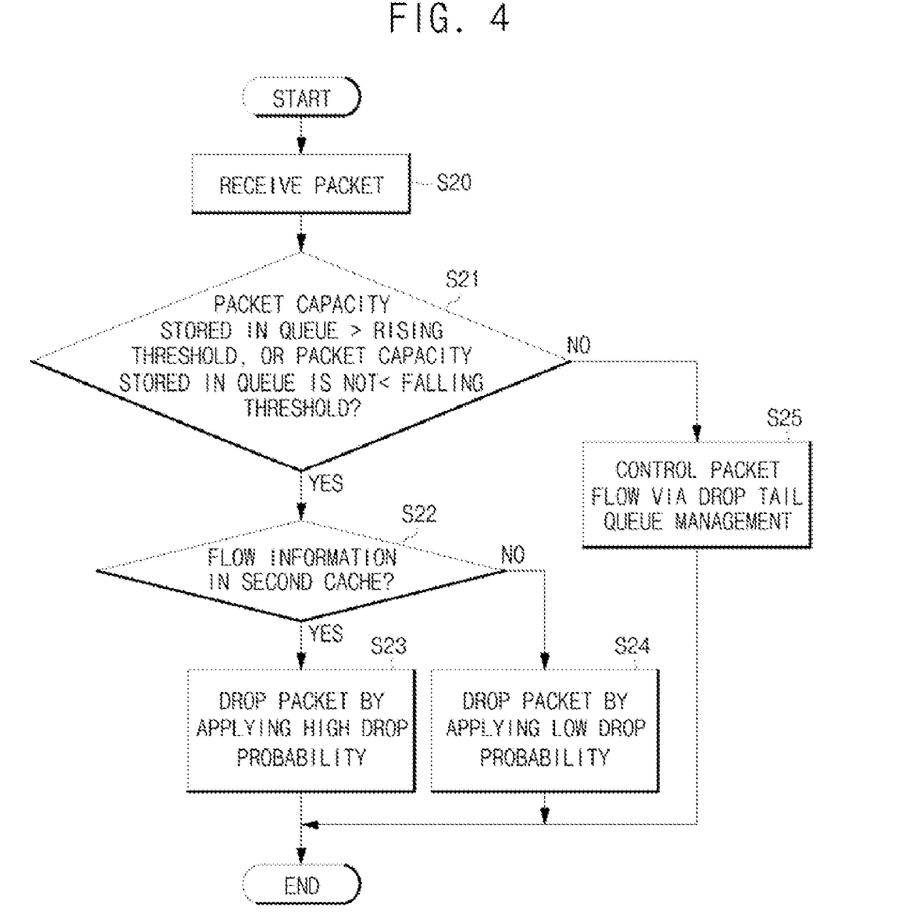
FIG. 4 is a flowchart illustrating a queue processing method of a router constructed according to the principles of the present invention.

FIG. 4 is a flowchart illustrating a queue processing method of a router according to the invention.

As shown in FIG. 4, when a packet is received in the queue buffer in S20, the router checks whether or not packet capacity stored in the queue of the queue buffer exceeds a rising threshold, or is below the falling threshold after exceeding the rising threshold in S21.

If the packet capacity stored in the queue of the queue buffer exceeds the rising threshold, or is not below the falling threshold after exceeding the rising threshold, the router controls packet flow via DCRED.

That is, the router checks whether or not flow information of the received packet is stored in the second cache in a state where the packet capacity stored in the queue exceeds the rising threshold, or is not below the falling threshold after exceeding the rising threshold in S22.

If the flow information of the received packet is present in the second cache in the state where the packet capacity stored in the queue is not below the falling threshold after exceeding the rising threshold, the router drops the received packet using a high drop probability in S23. The high drop probability is shown in FIG. 5A.

Conversely, if the flow information of the received packet is not stored in the second cache in the state where the packet capacity stored in the queue is not below the falling threshold after exceeding the rising threshold, the router drops the received packet using a low drop probability in S24. The low drop probability is shown in FIG. 5B.

It can be appreciated that the drop probability shown in FIG. 5A is higher than the drop probability shown in FIG. 5B.

With the packet received in the queue buffer 20, if the packet capacity stored in the queue of the queue buffer does not exceed the rising threshold, or is below the falling threshold after exceeding the falling threshold, the packet processor 21 clears the second cache 24 and then controls the packet flow via drop-tail queue management in S25.

Figure 6:
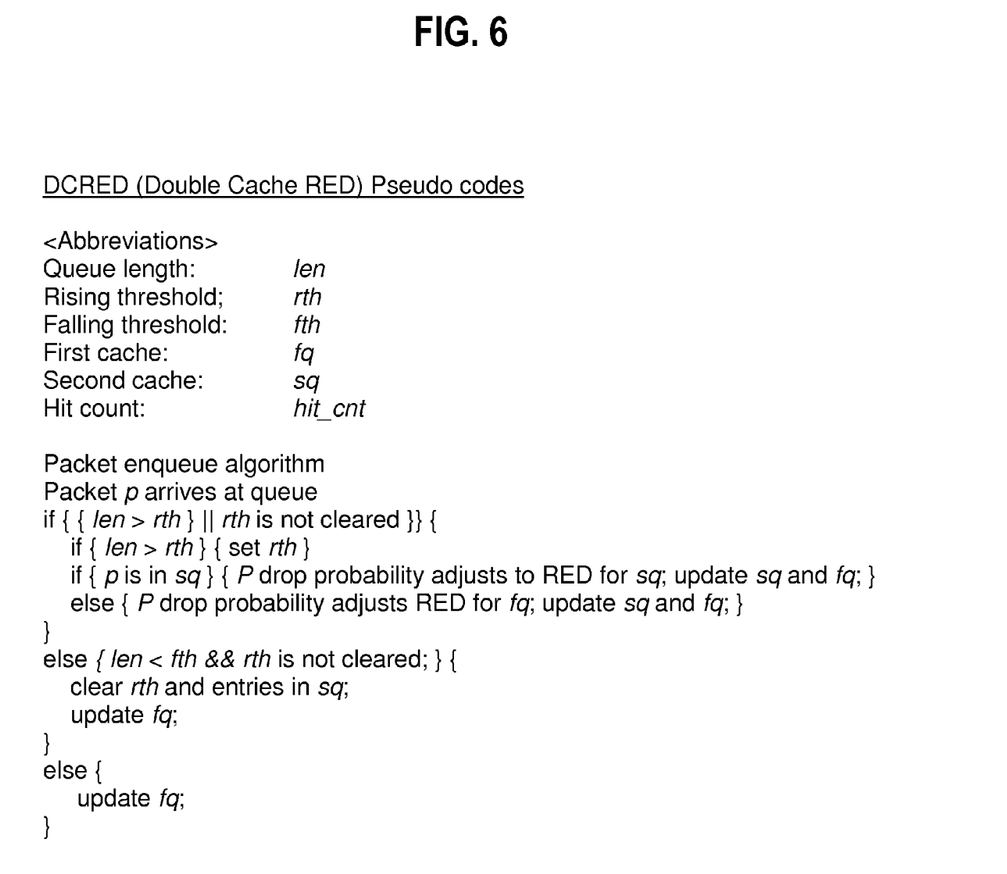
FIG. 6 and FIG. 7 illustrate a listing of pseudo codes in the cache update method and the queue processing method according to the principles of the present invention.
Figure 7:
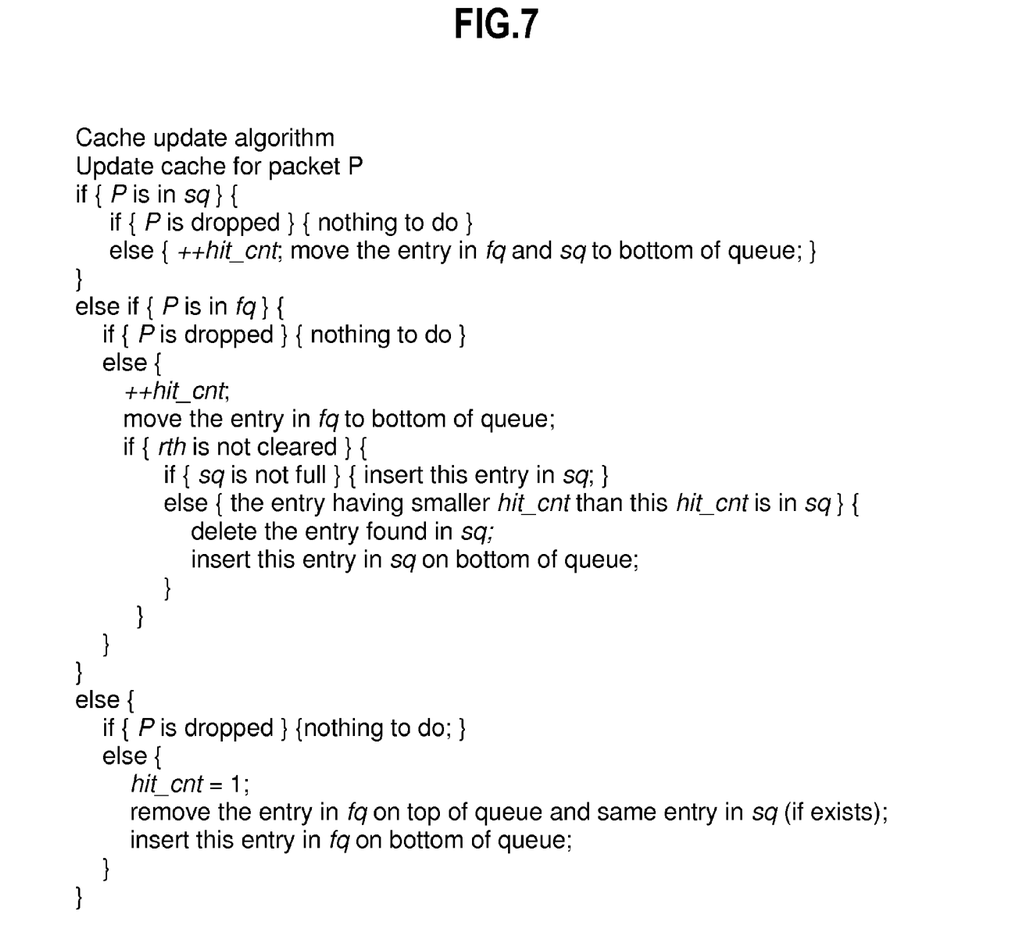

FIG. 6 and FIG. 7 illustrate pseudo codes in the cache update method and the queue processing method according to the invention.

As shown in FIG. 6 and FIG. 7, the pseudo codes associated with the cache update and queue processing methods of the router indicate that cache update and queue processing are carried out based upon whether or not packet capacity stored in the queue exceeds a rising threshold, or is below a falling threshold after exceeding the rising threshold.

That is, if the packet capacity stored in the queue exceeds the rising threshold, or is not below the falling threshold after exceeding the rising threshold, flow control is carried out via DCRED.

Conversely, if the packet capacity stored in the queue does not exceed the rising threshold, or is below the falling threshold after exceeding the rising threshold, flow control is carried out via drop-tail queue management.

If the capacity of the second cache is full in the state where the packet capacity stored in the queue exceeds the rising threshold, or is not below the falling threshold after exceeding the rising threshold, flow information, which has a hit count smaller than that of the received packet, is deleted from the second cache.

Conversely, if the capacity of the second cache is not full in the state where the packet capacity stored in the queue exceeds the rising threshold, or is not below the falling threshold after exceeding the rising threshold, flow information of the received packet is stored in the second cache.

The foregoing paragraphs describe a queue processing method and a router that perform cache update and queue processing based upon whether or not the packet capacity stored in the queue exceeds a rising threshold, or whether the packet capacity stored in the queue is below a falling threshold after the packet capacity stored in the queue has exceeded the rising threshold. This queue processing method and router makes it possible to eliminate overhead associated with the update of flow information by using two caches, while concomitantly removing the inequality of packet flows via RED queue management with the expedient of using two caches. The router and the queue processing method thereof according of the invention carry out cache update and queue processing based upon whether or not packet capacity stored in the queue exceeds a rising threshold, or is below a falling threshold after exceeding the rising threshold, and thus can eliminate overhead associated with the update of flow information by using two caches, and also remove the inequality of packet flows via RED queue management by using two caches. Consequently, this queue processing method and router are able to reduce a likelihood of an occurrence of inequality in service rendered to network subscribers due to a palliative allocation of a larger bandwidth to one, or more, subscribers attributable to a greater traffic flow originating from a minority of network users.

While the present invention has been shown and described in connection with the preferred embodiments, it will be apparent to those skilled in the art that modifications and variations can be made without departing from the spirit and scope of the invention as defined by the appended claims.

What is claimed is:

1. A router, comprising:
a first cache configured to store flow information of received packets each time a packet is received in a queue;
a second cache configured to store flow information of received packets if a number of the received packets in the queue exceeds a rising threshold;
and a packet processor to discard a received packet by applying a high drop probability if flow information of the received packet is stored in the second cache and if the number of the received packets in the queue exceeds the rising threshold, and the packet processor to update the second cache by storing the flow information of the received packet in the second cache if the second cache is not full and if the number of packets in the queue exceeds the rising threshold,
wherein the flow information comprises:
IP address and port number associated with the received packet; and
a hit count of the received packet having the IP address and the port number,
wherein if the second cache is full and if the number of the received packets in the queue exceeds the rising threshold, the packet processor deletes a flow information stored in the second cache, which has a hit count smaller than a hit count of the received packet and then stores the flow information of the received packet in the second cache, and
wherein the packet processor discards the received packet by applying a low drop probability if the flow information of the received packet is not stored in the second cache and if the number of the received packets in the queue exceeds the rising threshold.

2. A router, comprising:
a first cache configured to store flow information of received packets each time a packet is received in a queue;
a second cache configured to store flow information of received packets if a number of the received packets in the queue exceeds a rising threshold;
and a packet processor to discard a received packet by applying a high drop probability if flow information of the received packet is stored in the second cache and if the number of the received packets in the queue exceeds the rising threshold, and the packet processor to update the second cache by storing the flow information of the received packet in the second cache if the second cache is not full and if the number of packets in the queue exceeds the rising threshold,
wherein the packet processor to clear the second cache and then to control a packet flow using drop-tail queue management if the number of packets in the queue does not exceed the rising threshold, and
wherein the packet processor discards the received packet by applying a low drop probability if the flow information of the received packet is not stored in the second cache and if the number of the received packets in the queue exceeds the rising threshold.

3. A queue processing method of a router comprising a queue, and a first cache and second cache to store flow information of received packets, the method comprising:
- when a packet is received by the router in the queue, storing flow information of the packet in the first cache;
- determining whether a number of the received packets in the queue receiving the received packets exceeds a rising threshold, and storing flow information of the packet in the second cache if the number of the received packets in the queue exceeds the rising threshold;
- when the number of the received packets stored in the queue is determined to exceed the rising threshold, discarding the received packet by applying a high drop probability if flow information of the received packet is stored in the second cache;
- when the number of the received packets in the queue does not exceed the rising threshold, clear the second cache and then controlling a packet flow using drop-tail queue management; and
- discarding the received packet by applying a low drop probability if the flow information of the received packet is not stored in the second cache and if the number of the received packets in the queue exceeds the rising threshold,
- wherein the flow information comprises:
  - IP address and port number associated with the received packet; and
  - a hit count of the received packet having the IP address and the port number.

4. A method of updating a first cache and a second cache of a router comprising a queue, and the caches to store flow information of received packets, the method comprising:
- after receiving a packet in the queue, storing flow information of the packet in the first cache; and storing flow information of the packet in the second cache if a number of the received packets in the queue exceeds a rising threshold;
- determining, in the router, whether the second cache is full if the number of the received packets in the queue receiving the received packets exceeds the rising threshold;
- in response to detection of the second cache being full, deleting a flow information on the to of the second cache, which has a hit count smaller than a hit count of the received packet, and then storing the flow information of the received packet on the bottom of the second cache;
- discarding the received packet by applying a high drop probability if the flow information of the received packet is stored in the second cache and if the number of the received packets in the queue exceeds the rising threshold;
- and discarding the received packet by applying a low drop probability if the flow information of the received packet is not stored in the second cache and if the number of the received packets in the queue exceeds the rising threshold.

5. The cache update method according to claim 4, further comprising:
- if the second cache is not full and if the number of the received packets in the queue exceeds the rising threshold, storing flow information of the received packet in the second cache.

* * * * *